United States Patent
Calzone

(10) Patent No.: US 7,249,538 B2
(45) Date of Patent: Jul. 31, 2007

(54) MANIPULATOR FOR AUTOMATIC SCREWDRIVER

(76) Inventor: Ronald John Calzone, 33867 Highway E, Dixon, MO (US) 65459

( * ) Notice: Subject to any disclaimer, the term of this patent is extended or adjusted under 35 U.S.C. 154(b) by 0 days.

(21) Appl. No.: 11/204,485

(22) Filed: Aug. 16, 2005

(65) Prior Publication Data
US 2006/0191380 A1    Aug. 31, 2006

Related U.S. Application Data

(60) Provisional application No. 60/601,769, filed on Aug. 16, 2004.

(51) Int. Cl.
*B25B 23/06* (2006.01)
*B25B 21/00* (2006.01)
(52) U.S. Cl. ........................... 81/57.4; 81/57.41
(58) Field of Classification Search ............... 81/57.36, 81/57.4, 57.41
See application file for complete search history.

(56) References Cited

U.S. PATENT DOCUMENTS 2,316,747 A * 4/1943 Stephens ..................... 104/2
2,471,793 A * 5/1949 Stull ......................... 81/57.37

* cited by examiner

Primary Examiner—David B. Thomas

(57) ABSTRACT

The instant invention relates to the manufacture and/or repair of trailer and truck decks or similar. In particular, the invention relates to the installation of self tapping screws into pre-drilled holes or the installation of self drilling, self tapping screws where no hole yet exists. The machine has a cross beam with rails for a wheeled carriage which supports a linear actuator for an automatic screwdriver or, in another variation, a screw driving machine with an integral linear actuator. This wheeled carriage facilitates the movement of the screwdriver in a straight line in the X direction, laterally, across the deck, while wheeled trucks on the cross beam allow it, along with the carriage, to be moved in the Y direction, longitudinally, down the length of the deck. The actuator moves the screwdriver axially (Z direction) with each installation of a screw. Said movement is facilitated by a linear actuating device, such as a pneumatic cylinder. Because the cross beam is positioned parallel to a row of holes which have been drilled by a drilling device on the same or a similar cross beam, the operator, or other facility for X or lateral positioning, is relieved of the need to position the screw driver in the Y or longitudinal direction. The instant invention positions the screw driver in a plumb orientation, advances the automatic screwdriver to the work surface and resolves the torque and thrust which results from the application of the screws. It also supports the screw driver the correct height above the deck and facilitates proper countersinking, where desired.

6 Claims, 4 Drawing Sheets

MANIPULATOR FOR AUTOMATIC SCREWDRIVER

The application herein is pursuant to prior application No. 60/601,769, filed Aug. 16, 2004, the priority of which is hereby claimed.

CROSS-REFERENCE TO RELATED APPLICATIONS (Not Applicable)

STATEMENT REGARDING FEDERALLY SPONSORED RESEARCH OR DEVELOPMENT (Not Applicable)

REFERENCE TO SEQUENCE LISTING (Not Applicable)

BACKGROUND OF THE INVENTION

Previously is was necessary to utilize either large and cost prohibitive fixtures or laborious and fatiguing manual techniques for installation of deck screws in truck and trailer decks and the like. Hand held impact wrenches and electric drills required the operator to work on his knees or in a stooped posture. Stand up "T" handle screwdrivers place the operator in a more ergonomic posture, but require a relatively high skill level for the operator to place the screwdriver bit, which is on the end of the long tool, into the head of the screw, which is at his feet. In the case of screwdrivers with an automatic screw feed, similar skill was required to place the end of the screw in the pre-drilled hole. Furthermore, the operator was responsible for (1) keeping the tool plumb, (2) providing adequate down force to keep the screw driver bit engaged with the screw, (3) determining the proper depth or countersinking of the applied screw, and, (4) using muscle power to resolve the considerable torque the tool produces. This demanding process was relatively slow and labor intensive and sometimes results in injuries when the torque of the tool overpowers the operator. Since both hands are required to operate the hand held power screw driver, an expensive screw feeding system must be employed to achieve acceptable levels of production.

Prior art does not provide either the stability, or adaptability, or both, to accommodate a wide variety of situations, particularly considering the relatively large size of the floor screws used in trailer and truck bed decking and the large surface area to which those screws are applied.

The instant invention addresses all of the aforementioned problems through the use of mechanical means, including linear motion slides and pneumatic power.

SUMMARY OF THE INVENTION

A purpose of the invention is to facilitate a safer, more economical means of installing self-tapping or self-drilling screws while maintaining a high level of flexibility and portability.

It's advantage over large fixtures which use several automatic screwdrivers fixed on a gantry includes both cost of implementation and flexibility in use. Said large fixtures generally fix the placement of the screwdrivers so that a desired change in the spacing of the screws is inconvenient. Since many manufacturers of truck and trailer beds, and the like, require frequent adjustment of the lateral screw placement, and since the instant invention allows the operator flexibility in the placement of each screw, said invention provides distinct advantages over prior art. Since the invention may be implemented in either a fixed cross beam or a portable cross beam, the portability of the invention permits greater flexibility in manufacturing processes.

Whereas the aforementioned large fixtures require several automatic screwdrivers to place the several screws across the width of a bed, the instant invention can place all the screws with as few as one screwdriver. Significant cost savings are realized in both initial procurement and maintenance.

The invention's advantage over conventional hand-held use of impact wrenches, hand held drills with screwdriver bits, and automatic "T" handle screwdrivers is obvious to anyone skilled in the art. The invention is comprised of a cross beam, which can either be permanently fixed in place above a production line, or portable and placed on top of a truck or trailer bed, or the like, and clamped in place. In the portable variation of the invention, wheeled trucks on both ends of the cross beam facilitate movement longitudinally, along the length of the bed. The cross beam, and all it contains, roll on the surface of the bed or rails which run parallel to the bed. Once positioned in place over and parallel to a cross member on the bed, where a row of screws is to be installed, the cross beam is clamped in place with integral clamps on either end of the cross beam. The fixing of the cross beam over said cross member alleviates the need of the operator to determine longitudinal placement of each screw. This is of particular advantage when the screwdriver manipulator, including its own carriage, follows a drilling mechanism, on its own carriage, on the same cross beam. Once the cross beam is properly positioned and clamped in place, the operator need only position the carriage in the proper lateral position (X direction) and press a button to advance and actuate the screw driver axially, in the Z direction, thus applying the screw to the work.

The cross beam of the instant invention consists of rails upon which one or more wheeled carriages traverse the length of the beam, laterally across the width of the truck or trailer bed. The rails and carriage resist the thrust and torque resulting from the screw driving process. The carriages may support both screwdrivers and drilling devices which run in advance of the screwdrivers.

A column affixed to the carriage facilitates the mounting of a linear motion slide, which is actuated axially by a pneumatic cylinder or the like. This linear motion slide and it's bracketry form a mounting base for a commercially available automatic screwdriver. Said slide advances the screwdriver to the work surface, provides the force necessary to keep the screwdriver bit engaged with the screw, and retracts once the screw is placed.

A handle extending from the aforementioned column facilitates movement of the carriage and all it contains, with one of the operator's hands. A thumb or finger operated switch or valve in close proximity to the handle is used to actuate the linear motion slide with the same hand. The other hand remains free to drop screws into a receiver tube which delivers them to the nose piece of the screwdriver.

Further aspects of the invention will become apparent from consideration of the drawings and the ensuing description of preferred embodiments of the invention. A person skilled in the art will realize that other embodiments of the invention are possible and that the details of the invention can be modified in a number of respects, all without departing from the inventive concept. Thus, the following drawings and description are to be regarded as illustrative in nature and not restrictive.

IN THE DRAWINGS

The features of the invention will be better understood by reference to the accompanying drawings which illustrate presently preferred but not exclusive embodiments of the invention. In the drawings.

DETAILED DESCRIPTION OF THE INVENTION

Figure 1:
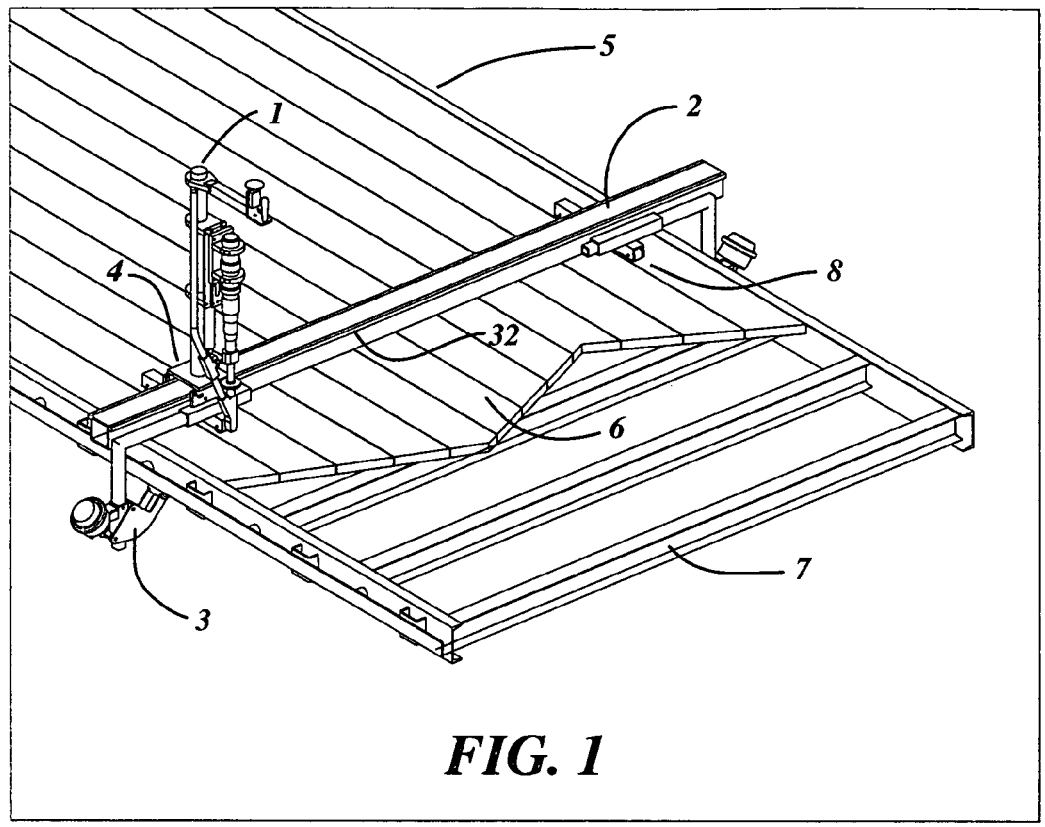
FIG. 1 is a perspective view of the invention in place on a truck or trailer bed with a cut-a-way view of the decking material to illustrate the bed's cross members below.
Figure 2:
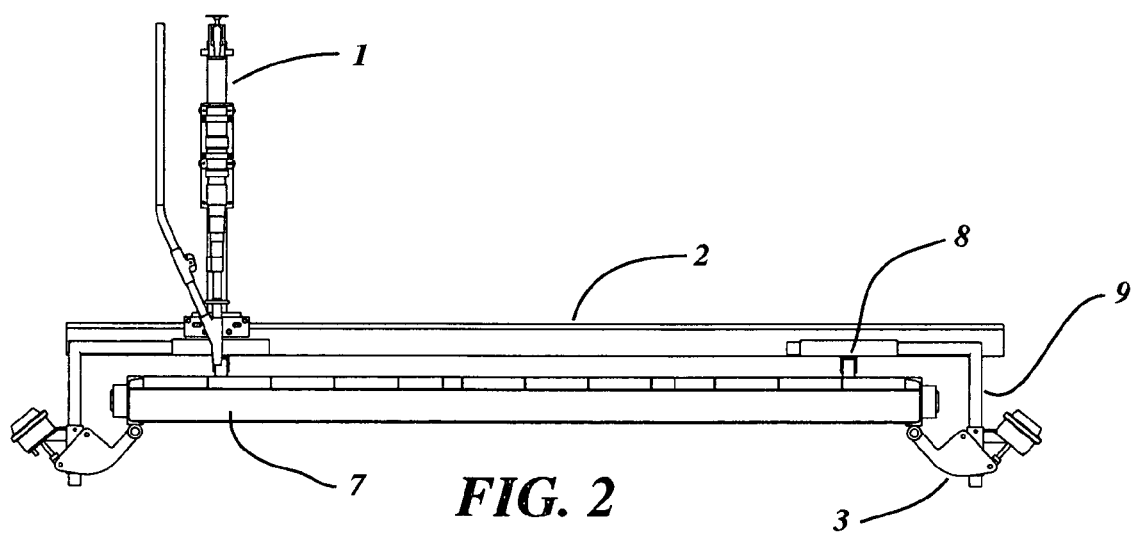
FIG. 2 is a side view of the invention positioned on a truck or trailer bed.

Referring to FIGS. 1 and 2, numeral 1 generally refers to the automatic screwdriver manipulator of this invention. It is shown employed on the flat deck of a truck or trailer 5 with the decking material and cross members of said deck indicated by numerals 6 and 7, respectively. The invention applies screws to fasten the deck material 6 to the cross members 7.

The screwdriver manipulator of this invention is comprised of a cross beam 2, supported by wheeled trucks 8 which facilitate the easy movement of the entire assembly longitudinally along the length of the deck. The cross beam is clamped securely in place during operation by clamps 3 on either end of the cross beam. The carriage 4 freely moves laterally across the width of the deck on rails 32 which are integral with the cross beam 2. This carriage resolves axial and torsional forces resulting from the screw driving operation while facilitating lateral movement from screw position to screw position across the width of the deck.

Figure 3:
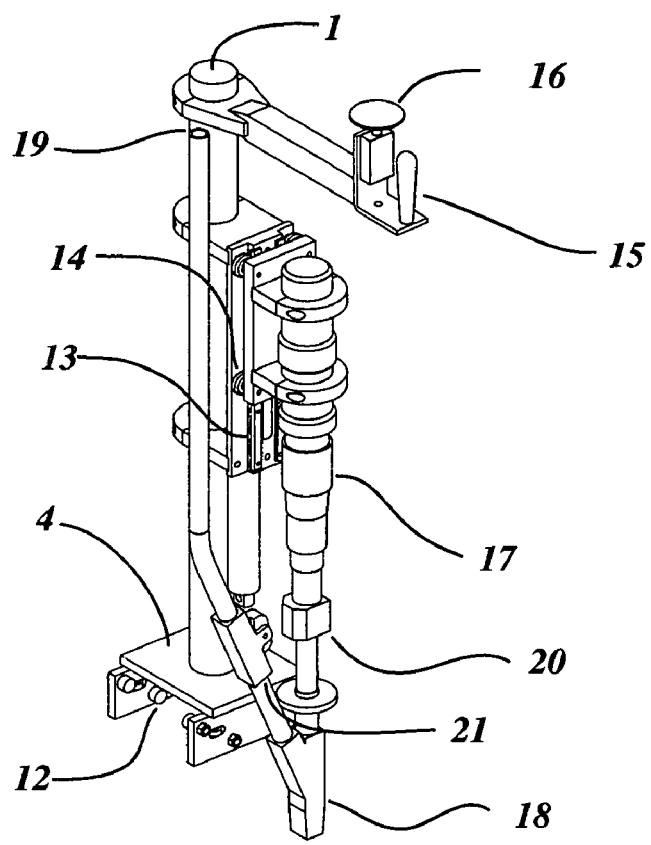
FIGS. 3 and 4 are perspective views of the the carriage and all it entails, including the column, the linear slide, the bracketry affixing the slide to the column, a commercially available automatic screwdriver, and the bracketry affixing the screwdriver to the linear slide.
Figure 4:
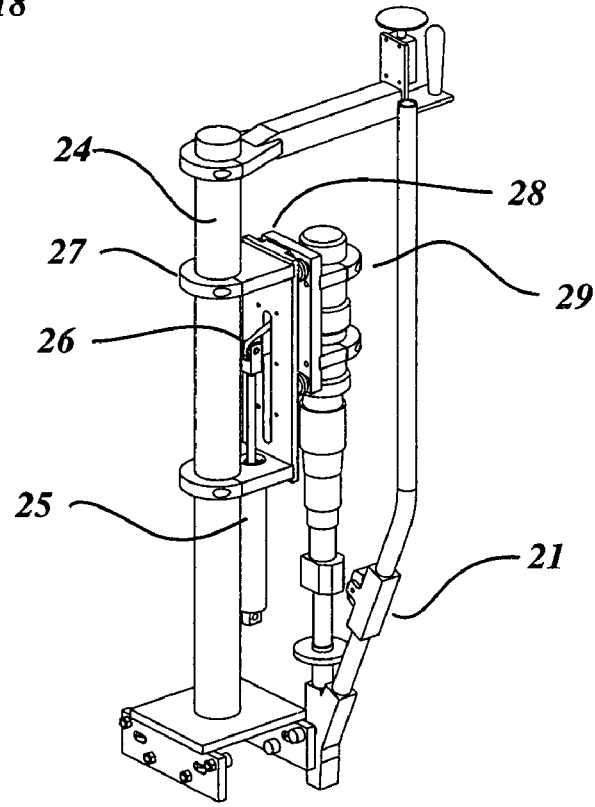

Referring to FIGS. 3 and 4, the relationship of a commercially available automatic screwdriver 17 to the automatic screwdriver manipulator is illustrated. In another variation, the screw driving mechanism is part of a spindle extension extended or manipulated by a quill moving linearly, in an axial direction. The screwdriver is affixed to the manipulated portion of a linear slide 28 by clamp rings 29. "V" type anti-friction wheels 14 engage tracks on the base 13 of the linear slide in a fashion that permits movement along the axis of the screwdriver while resisting movement and torsion in all other directions.

The linear slide base 13 mounts on column 24 by means of clamp rings 27. Said clamp rings permit the vertical and rotational adjustment of the entire slide assembly, along with the screwdriver. A linear actuating device, such as a pneumatic cylinder 25 engages a transverse member 26 which is attached to the manipulated portion of the linear slide 28. Said transverse member protrudes through a slot in the base 13 of the linear slide. In another variation the linear motion is accomplished by a commercially available feed unit which has been adapted to support an automatic screw driving mechanism.

The column 24 is rigidly fixed to the carriage 4. Anti-friction rollers 12 permit easy movement of the entire assembly by one of the operator's hands, placed on the hand grip 15. The thumb of that same hand actuates a valve or switch 16 in order to initiate a screw driving cycle. The proximity valve or switch 20 controls the countersink depth of the screw and initiates the return cycle. The free hand is used to drop screws into the screw feed tube 19 on demand. A screw meter 21 facilitates stacking screws in the screw feed tube above the screw meter and drops one screw per cycle into the tube below the screw feed meter. An alternate to the screw feed tube is a commercially available remote screw feed system familiar to those practiced in the art.

Figures 5, 6:
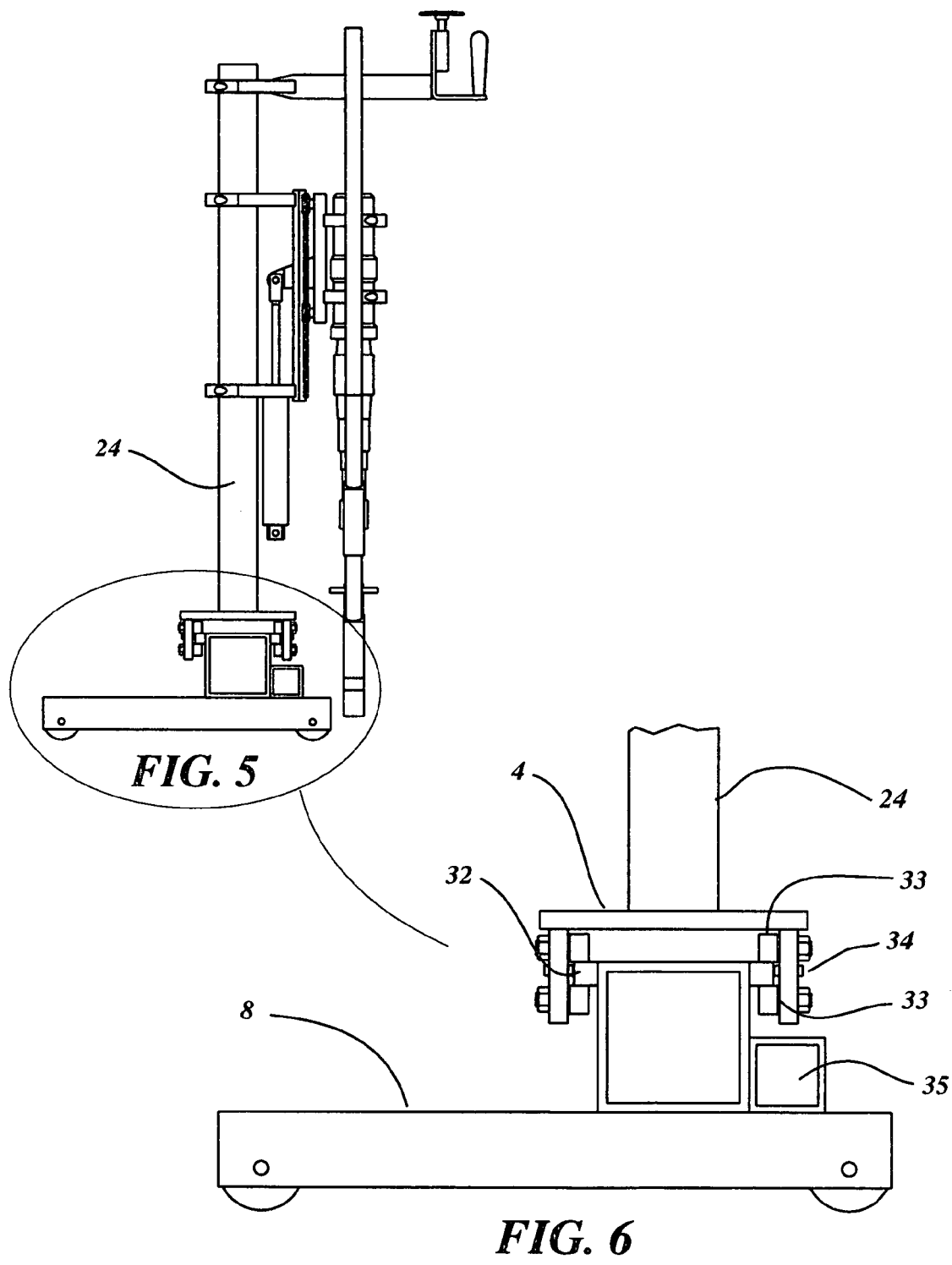
FIG. 5 shows and end view of the cross beam with the complete carriage assembly positioned on the cross beam's rails.
FIG. 6 is a detail view of the lower portion of FIG. 4.

Referring to FIGS. 5 and 6, this end view of the cross beam illustrates details of the carriage 4, the wheeled truck 8, and the clamp "L" bracket receiver 35.

Anti friction rollers 33 fixed to the carriage 4 and positioned both above and below the cross beam rails 32 restrain the carriage and it's attendant components from vertical movement. Additionally, ball bearings 34 engage the rails to resolve forces in the lateral direction, relative to FIG. 6. This mechanism permits free movement of the carriage along the cross beam.

Figure 7:
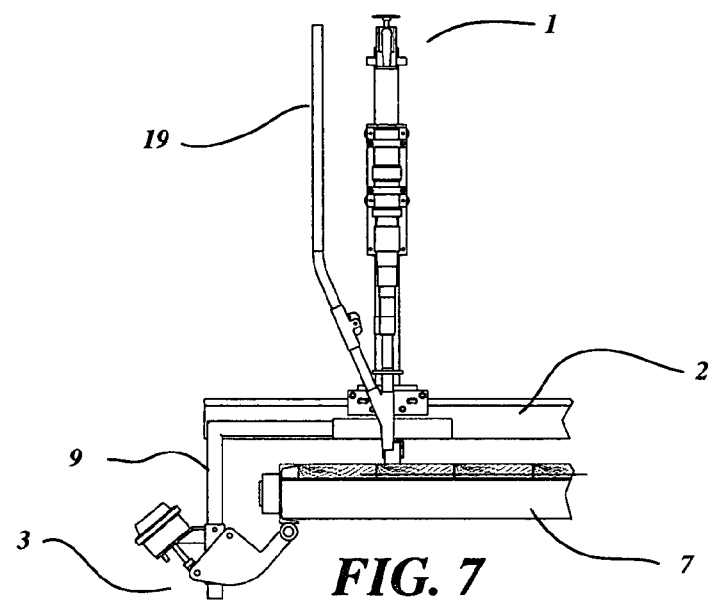
FIG. 7 is a side view of one end of the cross beam showing the relationship of the carriage assembly to the deck and clamping mechanism.
Figure 8:
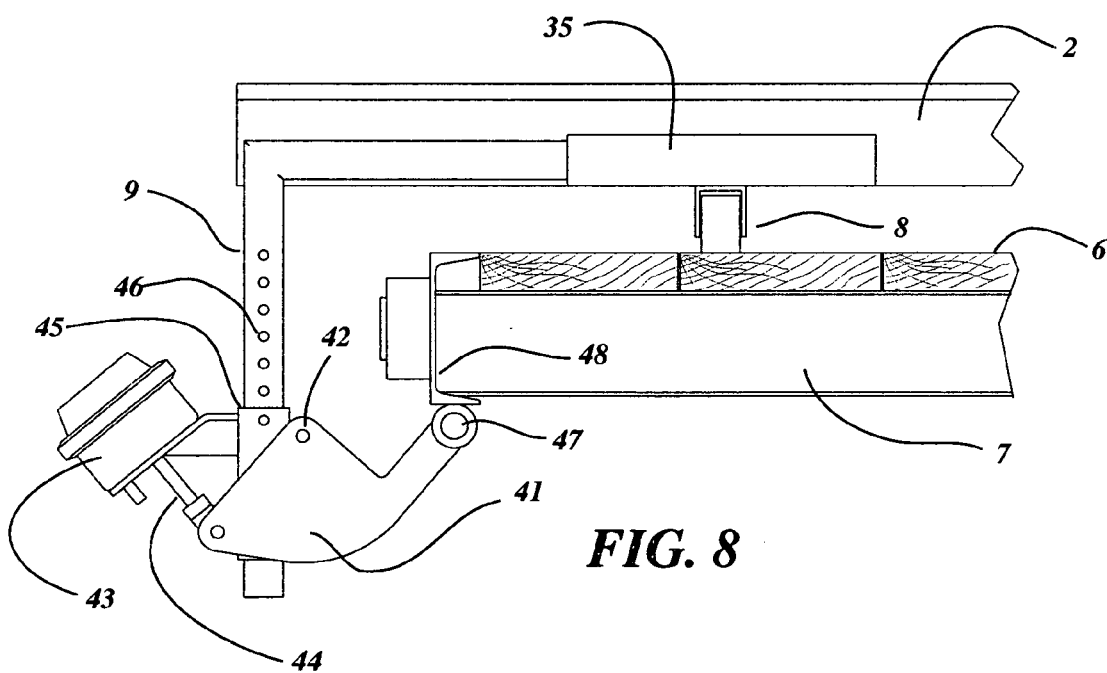
FIG. 8 is a detail view of FIG. 7, showing the clamping mechanism.

The clamp "L" bracket receiver 35 accepts the "L" bracket 9 depicted in FIGS. 2, 7, and 8. Further detail of its operation will be forthcoming.

Referring to FIGS. 7 and 8, the wheeled trucks 8 are shown in a variation of the invention in which the cross beam rides directly on the truck or trailer deck. An alternate variation would have the wheel trucks riding on a stationary fixture positioned parallel to the deck.

The clamp 3 is depicted in an engaged position. It consists of a pivotal member 41 which rotates around an axle 42. An air chamber 43 actuates the pivotal member by means of a push rod 44. The end of the pivotal member 47 engages the side rail 48 of the truck or trailer deck and resists the thrust and torsional forces of the drilling and screw driving process. Where no side rail 48 exists, a round bar may be inserted through the end of the pivotal member 47 so that it spans the two nearest cross members 7 and engages both at the same time.

The entire assembly is adjusted vertically by moving its receiver 45 along "L" bracket 9 and pinning it in place in one of the holes 46. It is adjustable horizontally to accommodate various widths of decks by sliding "L" bracket 9 in and out of "L" bracket receiver 35.

Many variations of the invention will occur to those skilled in the art. Some variations include the use of a drilling device in conjunction with the screw driver on the same cross beam. Other variations call for the use of manual means of clamping. Other variations utilize various linear motion slides. Furthermore, pneumatic valves or electrical switches may be employed. All such variations are intended to be within the scope and spirit of the invention.

Although some embodiments are shown to include certain features, the applicant(s) specifically contemplate that any feature disclosed herein may be used together or in combination with any other feature on any embodiment of the invention. It is also contemplated that any feature may be specifically excluded from any embodiment of an invention.

REFERENCES CITED

| | | | |
|---|---|---|---|
| 1,247,341 | November 1917 | Skinner | 408/77 |
| 2,283,338 | May 1942 | Pegard | 408/77 |
| 2,546,957 | March 1951 | Ray | 164/86 |
| 3,180,183 | April 1965 | Stanley et al. | 77/34 |
| 3,981,605 | September 1976 | Wirsing | 408/88 |
| 4,765,785 | August 1988 | Calzone | 408/77 |
| 5,123,158 | June 1992 | Dixon | 81/430 |

The invention claimed is:

1. An apparatus for driving screws along a defined path in an X-axis direction on a surface having X and Y axis dimensions, the surface comprising a planar, rectangular deck area and having a perimeter frame forming sides of the planar deck area, the apparatus comprising a support beam connected at opposite ends to wheeled trucks supported upon the planar deck area where the support beam is disposed in the X-axis direction, guide rails disposed along the beam in parallel relation to the beam, a carriage adapted for movement along the guide rails in the X-axis direction, a screw driving machine being mounted on the carriage, the screw driving machine being adapted for vertical movement in a Z-axis direction in relation to the carriage, the apparatus being further provided with clamp assemblies at opposite ends of the beam, the clamp assemblies being engagable with the perimeter frame to secure the apparatus in fixed position on the surface for limiting movement of the carriage to the defined path in the X-axis direction along the surface while the clamp assemblies are engaged, the screw driving machine having a screw driving member to drive screws into the deck, the screw machine having a screw feed tube for delivering screws into vertical alignment below the screw driving member, the screw machine further having a depth control member to limit a depth which the screw driving member can travel to control the depth to which the screw is driven into the deck, the wheeled trucks permitting movement of the apparatus to variable positions along the planar deck area in the Y-axis direction upon disengagement of the clamp assemblies.

2. The apparatus of claim 1 in which the clamp assembly comprises:
   a) a leg bracket member;
   b) a leg bracket receiving member;
   c) an engaging member; and
   d) a tightening member;
   the leg bracket receiving member being connected to the support beam, the leg bracket being adapted to slidably receive a first end of the leg bracket member for variable extension of the leg bracket member in the X-axis direction, the engaging member being adapted to slidably receive a second end of the leg bracket member for variable extension of the engaging member in the Z-axis direction, the tightening member being adapted to push the engaging member against the perimeter frame to secure the clamp assembly in place on the planar deck area.

3. The apparatus of claim 2 in which the engaging member is pivotable about its connection with the leg bracket member, and the tightening member comprises a push rod actuated by a power source.

4. An apparatus for drilling holes and driving screws along a defined path in an X-axis direction on a surface having X and Y axis dimensions, the surface comprising a planar, rectangular deck area and having a perimeter frame forming sides of the planar deck area, the apparatus comprising a support beam connected at opposite ends to wheeled trucks supported upon the planar deck area where the support beam is disposed in the X-axis direction, guide rails disposed along the beam in parallel relation to the beam, a carriage adapted for movement along the guide rails in the X-axis direction, a drilling machine being mounted on the carriage, a screw driving machine further being mounted on the carriage, the screw driving machine being adapted for vertical movement in a Z-axis direction in relation to the carriage, the apparatus being further provided with clamp assemblies at opposite ends of the beam, the clamp assemblies being engagable with the perimeter frame to secure the apparatus in fixed position on the surface for limiting movement of the carriage to the defined path in the X-axis direction along the surface while the clamp assemblies are engaged, the screw driving machine having a screw driving member to drive screws into the deck, the screw machine having a screw feed tube for delivering screws into vertical alignment below the screw driving member, the screw machine further having a depth control member to limit a depth which the screw diving member can travel to control the depth to which the screw is driven into the deck, the wheeled trucks permitting movement of the apparatus to variable positions along the planar deck area in the Y-axis direction upon disengagement of the clamp assemblies.

5. The apparatus of claim 4 in which the clamp assembly comprises:
   a) a leg bracket member;
   b) a leg bracket receiving member;
   c) an engaging member; and
   d) a tightening member;
   the leg bracket receiving member being connected to the support beam, the leg bracket being adapted to slidably receive a first end of the leg bracket member for variable extension of the leg bracket member in the X-axis direction, the engaging member being adapted to slidably receive a second end of the leg bracket member for variable extension of the engaging member in the Z-axis direction, the tightening member being adapted to push the engaging member against the perimeter frame to secure the clamp assembly in place on the planar deck area.

6. The apparatus of claim 5 in which the engaging member is pivotable about its connection with the leg bracket member, and the tightening member comprises a push rod actuated by a power source.

* * * * *